April 30, 1929.   H. PRATT   1,711,425

PISTON FOR INTERNAL COMBUSTION ENGINES

Filed Aug. 1, 1927

INVENTOR.
Hugh Pratt

Patented Apr. 30, 1929.

1,711,425

UNITED STATES PATENT OFFICE.

HUGH PRATT, OF CHESTER, ENGLAND.

PISTON FOR INTERNAL-COMBUSTION ENGINES.

Application filed August 1, 1927, Serial No. 209,841, and in Great Britain September 21, 1926.

This invention relates to pistons applicable for internal combustion engines and more particularly to improvements in pistons formed in two parts, the skirt being separate from the piston head carrying the piston rings.

According to the invention the skirt is attached to the gudgeon pin bosses to enclose the ends of the gudgeon pin and form a guard between the ends thereof, and the cylinder walls.

The invention will be described with reference to the accompanying drawings:—

Figure 1:
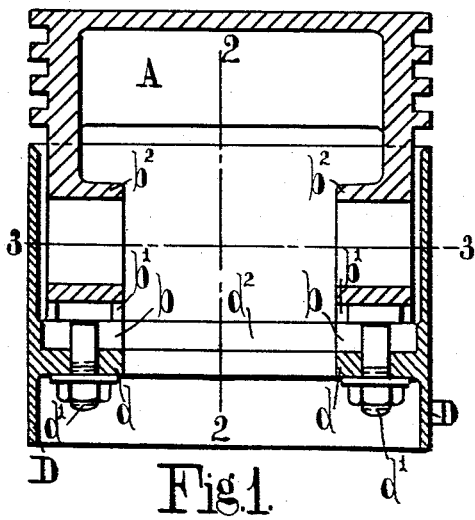
Fig. 1 is a vertical section on line 1—1 Fig. 2.
Figure 2:
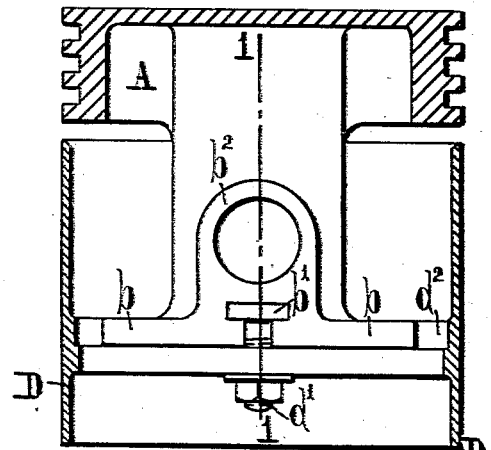
Fig. 2 is a vertical section on line 2—2 Fig. 1.
Figure 3:
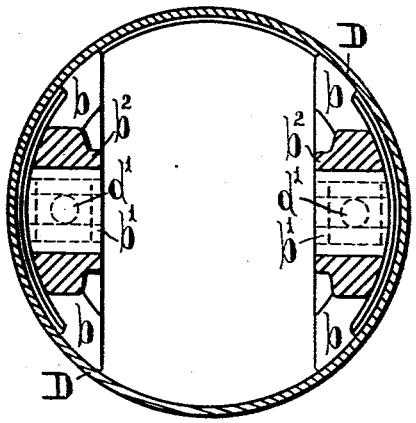
Fig. 3 is a transverse section on line 3—3 Fig. 1.
Figure 4:
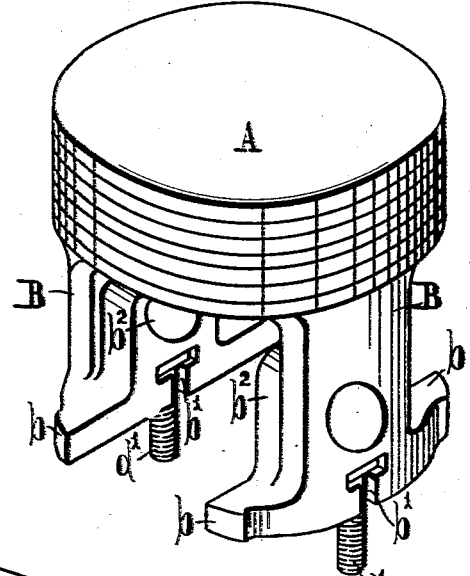
Fig. 4 is a perspective view of the piston head with the gudgeon pin bosses depending therefrom.
Figure 5:
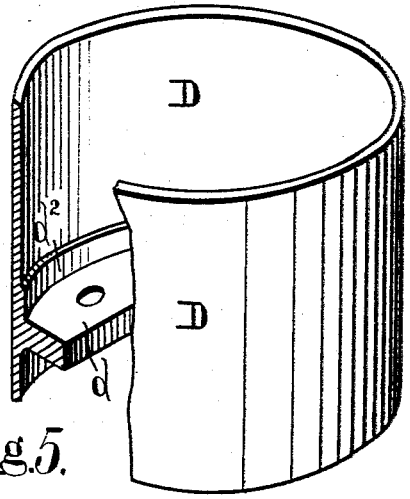
Fig. 5 is a perspective view partly in section of the skirt.

The piston head A is constructed with two depending arms or extensions B diametrically opposite one another and which form or carry the bosses $b^2$ for the gudgeon pin. The lower ends of the arms or extensions B are provided with brackets or feet $b$ which are machined on their peripheral surfaces so that they are true and concentric with the machined face of the head A.

The feet $b$ are provided with T slots $b^1$ to receive the heads of the bolts $d^1$ by which the skirt D is affixed to the feet $b$. The skirt D is provided with two integral flanges $d$ which register with the underside of the feet $b$ and through which the bolts $d^1$ project. The skirt D is provided with two integral flanges $d^2$ which register with the underside of the feet $b$ and through which the bolts $d^1$ project. The skirt D is also provided with an integral ring $d^2$ which registers with the machined peripheral faces of the feet $b$. By this construction the skirt may be machined all over both internally and externally and the skirt will always register with the piston head.

The skirt D extends upwards beyond the gudgeon pin bosses $b^2$ so that the ends of the gudgeon pin will be contained within the skirt and the cylinder walls will be protected from the possibility of rubbing by the gudgeon pins.

Moreover by this construction the piston head may be formed from suitable material for the dissipation of heat whilst the skirt may be made from suitable material from the point of view of expansion and friction. Also the construction is free from distortion by unequal expansion owing to the uniformity in section of the skirt and the flexibility of the extension B.

What I claim as my invention and desire to protect by Letters Patent is:—

1. In a piston of the type referred to the combination with the piston head of extensions depending therefrom, gudgeon pin bosses formed in said extensions, T headed bolts arranged in T slots in the extensions and a skirt portion held in position by said bolts.

2. In a piston of the type referred to the combination with the piston head of extensions depending therefrom, gudgeon pin bosses formed in said extensions, T headed bolts arranged in T slots in the extensions, a skirt portion held in position by said bolts, and flanges on said skirt portion to register with the underside of the extensions.

3. In a piston of the type referred to the combination with the piston head of extensions depending therefrom, gudgeon pin bosses formed in said extensions, T headed bolts arranged in T slots in the extensions, a skirt portion held in position by said bolts, flanges on said skirt portion to register with the underside of the extensions, and a ring on the skirt portion to register with machined faces in the extensions.

In testimony whereof I have hereunto set my hand.

HUGH PRATT.